(12) United States Patent
Bojorquez Valenzuela et al.

(10) Patent No.: US 8,512,475 B2
(45) Date of Patent: Aug. 20, 2013

(54) LIQUID SUGAR FROM RAW GRANULATED CANE SUGAR PURIFYING PROCESS

(75) Inventors: Mario Cesar Bojorquez Valenzuela, Mexico City (MX); Francisco Javier Perez Martinez, Guadalajara (MX); Jose Luis Flores Montano, Guadalajara (MX)

(73) Assignee: Comercializador de Productos Basicos de Mexico, S.A. de C.V., Bosques de las Lomas (ME)

( * ) Notice: Subject to any disclaimer, the term of this patent is extended or adjusted under 35 U.S.C. 154(b) by 247 days.

(21) Appl. No.: 12/808,484

(22) PCT Filed: Oct. 13, 2008

(86) PCT No.: PCT/MX2008/000138
§ 371 (c)(1),
(2), (4) Date: Aug. 17, 2010

(87) PCT Pub. No.: WO2009/136778
PCT Pub. Date: Nov. 12, 2009

(65) Prior Publication Data
US 2010/0307485 A1    Dec. 9, 2010

(51) Int. Cl.
*C13B 35/06* (2011.01)
(52) U.S. Cl.
USPC ........................................................ 127/46.2
(58) Field of Classification Search
None
See application file for complete search history.

(56) References Cited

U.S. PATENT DOCUMENTS

| | | | |
|---|---|---|---|
| 2,578,938 A | 12/1951 | Kunin et al. | |
| 2,785,998 A * | 3/1957 | Harding et al. | 127/46.2 |
| 3,122,456 A | 2/1964 | Meier et al. | |
| 3,563,799 A | 2/1971 | Zievers et al. | |

(Continued)

FOREIGN PATENT DOCUMENTS

| | | |
|---|---|---|
| DE | 2351641 | 5/1974 |
| GB | 984713 | 3/1965 |

(Continued)

OTHER PUBLICATIONS

Translation of JP03072900.*

(Continued)

*Primary Examiner* — Melvin C Mayes
*Assistant Examiner* — Stefanie Cohen
(74) *Attorney, Agent, or Firm* — Baker & McKenzie LLP

(57) ABSTRACT

This invention refers to a process for purifying sugar syrup, usually called liquid sugar, prepared with raw granulated cane sugar, in order to obtain a product called purified liquid sugar, with a degree of purity, referred to the content of ashes and color, similar or greater that the purity of a syrup prepared from refined granulated cane sugar, which is equivalent to a content of ICUMSA conductimetric ashes below 0.04% and a color of less than 45 ICUMSA units. The increase in direct reducing sugars content in the product is less than 0.2% with respect to the content of reducing sugars present in raw granulated cane sugar used as raw material for this process, and the pH is kept in the range of 6.0 to 7.5. The process consists of dissolving raw granulated sugar in order to obtain a syrup, filtering, primary bleaching by ion exchange with strong base anionic type resins, demineralizing and complementary bleaching by ion exchange with cationic-and anionic-type resins packed in a mixed bed column, polishing of the syrup by contact with an adsorbent powder material and filtering, and treatment with ultra violet rays.

16 Claims, 3 Drawing Sheets

(56) References Cited

U.S. PATENT DOCUMENTS

Figure 1:
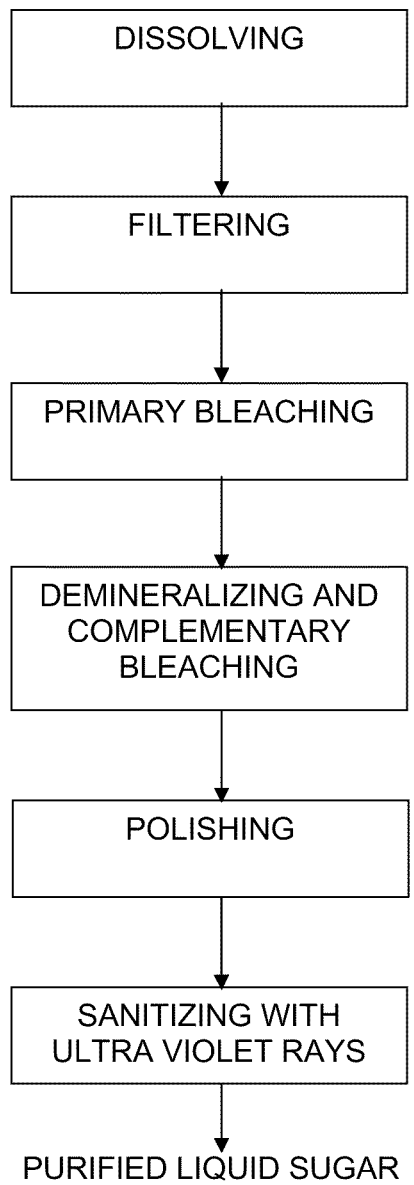

| | | |
|---|---|---|
| 4,187,120 A | 2/1980 | Kunin et al. |
| 4,193,817 A | 3/1980 | Dillman et al. |
| 4,950,332 A | 8/1990 | Stringfield et al. |
| 5,893,947 A | 4/1999 | Pease et al. |
| 7,226,511 B2 * | 6/2007 | Rein et al. .................. 127/46.2 |
| 7,662,234 B2 * | 2/2010 | Costesso et al. ............ 127/46.2 |

FOREIGN PATENT DOCUMENTS

| | | |
|---|---|---|
| JP | 03072900 A * | 3/1991 |
| WO | 9103574 | 3/1991 |
| WO | 9850588 | 11/1998 |

OTHER PUBLICATIONS

Mexican Standard NMX-F-084-SCFI-2004, 2004, 3 pages, Tables 1, 2 and 3.

Mexican Standard NMX-F-003-SCFI-2004, 2004, 3 pages, Tables 1, 2 and 3.

Chen, James, C.P., Cane Sugar Manual, Ed. Limusa, 2004, p. 56 (Table 1.4).

Chen, James, C.P., Cane Sugar Manual, Ed. Limusa, 2004, pp. 611-613.

* cited by examiner

LIQUID SUGAR FROM RAW GRANULATED CANE SUGAR PURIFYING PROCESS

TECHNICAL FIELD

This invention is related to the sugar industry, specifically the elaboration of sucrose syrup, and particularly the process of manufacturing refined sucrose syrup with a minimum content of inverted sugars, from raw granulated cane sugar, for its use in beverages, confectionery or bakery, in which the characteristics of cane sugar are an important factor in the physical-chemical and sensory parameters of the finished products.

INVENTION'S BACKGROUND

Cane sugar is usually traded in granulated form and is classified into different qualities according to its content of impurities, i.e., non-sucrose substances that mainly contribute to increase the rate of color and ashes which come from mineral elements such as potassium, magnesium, sulphates and phosphates, among others (Cane Sugar Manual, James C. P. Chen, Ed. Limusa, 2004, p 56).

As an industrial component, sugar is used for different processes and some users require it in the form of syrup to incorporate it into their processes, therefore, they perform a dilution in water in order to obtain sucrose syrup and then they process it in order to purify it, obtaining what is commonly called liquid sugar. The quality of the liquid sugar to be manufactured is determined by the quality of the granulated sugar used as raw material, the quality of the dilution water, and the type of process used to purify the syrup. When users require liquid sugar with refined sugar quality, they get the product dissolving refined granulated sugar with treated water, which implies additional processes in order to prepare the raw material, thus increasing production costs.

Refined granulated sugar obtained from cane juice is manufactured at sugar mills in two phases: the first phase produces low-purity granulated sugar called raw sugar, which is purified in the second phase. The first phase mainly consists of obtaining and clarifying the cane juice, concentrating and crystallizing the sucrose, centrifuging and drying sucrose crystals, thus obtaining raw sugar, which specifications of color and ashes are quite variable, both due to variations in the raw material used in its manufacturing and the clarification degree of the cane juice and the centrifugation of the sucrose crystals performed during the process. The Mexican Standard NMX-F-084-SCFI-2004 specifies as "standard sugar" the raw sugar with a maximum of 600 ICUMSA (International Commission for Uniform Methods of Sugar Analysis) color units and a maximum ICUMSA conductimetric ash content of 0.25%. The second phase, usually called refining, consists of purifying raw or standard sugar, dissolving again the raw granulated sugar in order to submit it again to various processes, such as: clarifying, filtering, carbonating, activated carbon bleaching, concentrating, crystallizing, centrifuging and drying, in order to obtain the product called refined sugar which specifications on impurity contents are usually below 45 ICUMSA units for color and 0.04% of ICUMSA conductimetric ashes, as specified in the Mexican Standard NMX-F-003-SCFI-2003.

Given the fact that certain users require sugar in the form of refined liquid sugar, it is not necessary to apply the re-dissolving and re-crystallizing process for its refining, as performed by sugar mills through the processes of dissolving, clarifying, filtering, carbonating, activated carbon bleaching, concentrating, crystallizing, centrifuging and drying raw or standard granulated sugar; since refined sugar in liquid form may be produced by purifying the syrup manufactured with raw sugar with a process such as that presented in this invention.

Usual purification processes applied to sugar syrups generally use ion-exchange resins (U.S. Pat. No. 2,578,938 and U.S. Pat. No. 2,785,998), which help remove anions and cations that are to be separated, which constitute impurities regarding the content of ashes and color of the sugar. However, these patents are not focused on the complete process of manufacturing purified liquid sugar.

Patent (GB984713) claims a process to purify 50 to 65% sucrose sugar solutions through bleaching and demineralization processes through ion exchange. The main purpose of this process is to reduce the growth of yeast and fungi, presenting a demineralization process at a temperature of 40-42° C. This is a disadvantage, since that is a relatively low temperature which produces greater viscosity in the syrup, with the resulting hydrodynamic problems for its handling, which eventually derives in increasing operation costs. Unlike this process, the process proposed in our invention considers working with syrup at a concentration preferably above 65% and a temperature between 65 and 70° C., with additional processes besides bleaching and demineralization such as: filtering and sanitizing with ultra violet rays, which contribute to inhibit the growth of fungi and yeast; since the main factor for sugar syrup preservation is water activity due to the high concentration of sucrose as proposed in this invention and not mineral contents as stated in patent GB984713. Also, the syrup's higher temperature during its processing contributes to its preservation, with the advantage of reducing the hydrodynamic and production cost problems which have already been mentioned.

U.S. Pat. No. 4,193,817 from year 1980, describes only the bleaching processes in liquid sugar syrups to be used in the bottled beverage industry, prepared from refined sugar mixed with standard sugar. The bleaching process is carried out in a semi-continuous way in columns with strong-base anion exchange resins in the form of chloride. This process, however, does not consider the parameter of ashes nor the degree of inversion of sugars contained in the product, which are important parameters to be controlled in the manufacturing of some beverages. Instead, our invention refers to a process that considers the removal of ashes without substantially increasing the content of inverted sugars in the product.

New resins with improved characteristics have come up, such as those presented in U.S. Pat. No. 4,950,332 of 1990, which mentions an adsorbent resin based on a macro porous copolymer used to bleach watery solutions of sugars, standing out for its advantages with the resins of U.S. Pat. No. 2,578,938, U.S. Pat. No. 3,122,456, and U.S. Pat. No. 4,193,817, arguing that all of them have lower adsorbency that carbon. However, this patent also addresses only bleaching of sugar solutions and does not cover the ash removal aspect, while our invention considers both the removal of color and ashes. Patent WO9103574 from year 1991, describes the process required to purify sugar solutions through bleaching, using anion exchange resins or reticulated porous mono vinyl; followed by a decationizer process based on cation exchange resins. This patent basically claims the type of resins developed for the bleaching process and does not cover the demineralization and sugar inversion aspects, which are considered in our invention.

A more recent invention, WO9850588 from 1998, describes a process to purify sugar solutions, which consists of bleaching and demineralizing sugar solutions without need of using cation exchange resins or activated carbon. The process includes contact phases of the sugar solution with a macro porous polymer adsorbent with cationic functional sites in order to complete the demineralization process. In this patent, as well as in the aforementioned ones, the innovations focus on the development of adsorbing resins and polymers to improve their characteristics and functional properties unlike this patent application which proposes a full process starting from raw granulated cane sugar in order to obtain sugar syrup, which, without using activated carbon in the bleaching process, allows controlling of color, of ash content and of inverted sugars in the product, at a lower cost and obtaining similar characteristics than those of syrups prepared from refined sugar.

Likewise, this invention proposes a purification process of syrup prepared with raw granulated cane sugar, by means of dissolving granulated sugar, filtering, bleaching and demineralizing it by ionic exchange, polishing and sanitizing it with ultra violet rays.

The process proposed in this invention enables the obtention of a product with similar characteristics as the solutions prepared from refined cane sugar and offers the user the advantage of an easier to use product, avoiding the sugar dissolution and conditioning processes, thus having an impact in the reduction of production costs.

DESCRIPTION OF THE INVENTION

The characteristics of the liquid sugar purifying process prepared from raw granulated cane sugar are clearly stated in the following description and figures, which are mentioned as an example and should not be considered as restrictive to this invention:

FIG. 1 is a process flowchart for the preparation of purified sugar from raw granulated cane sugar, stating the dissolving, filtering, primary bleaching, demineralizing and complementary bleaching, polishing and UV-ray sanitizing stages.

Figure 2:
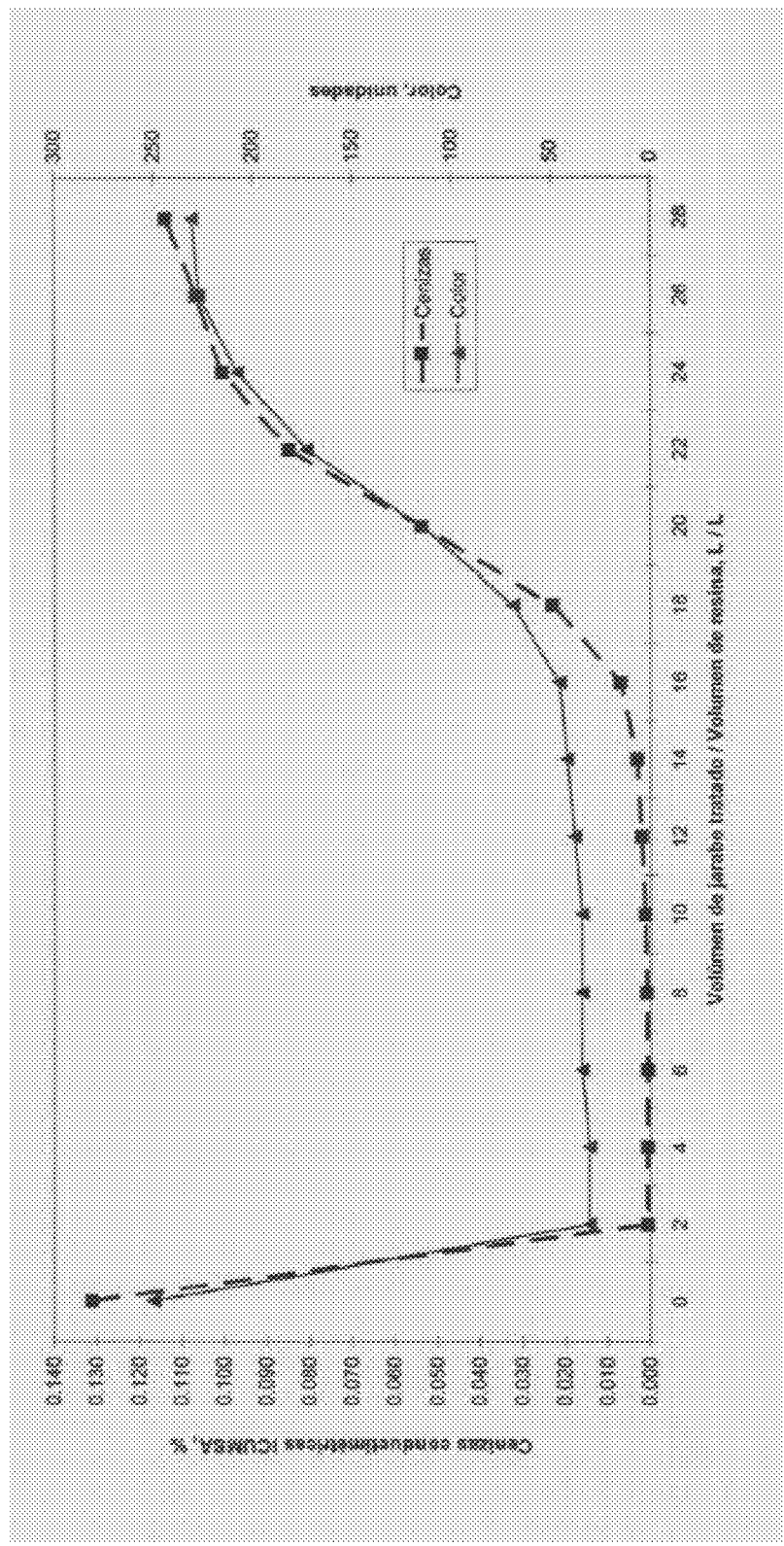
Figure 3:
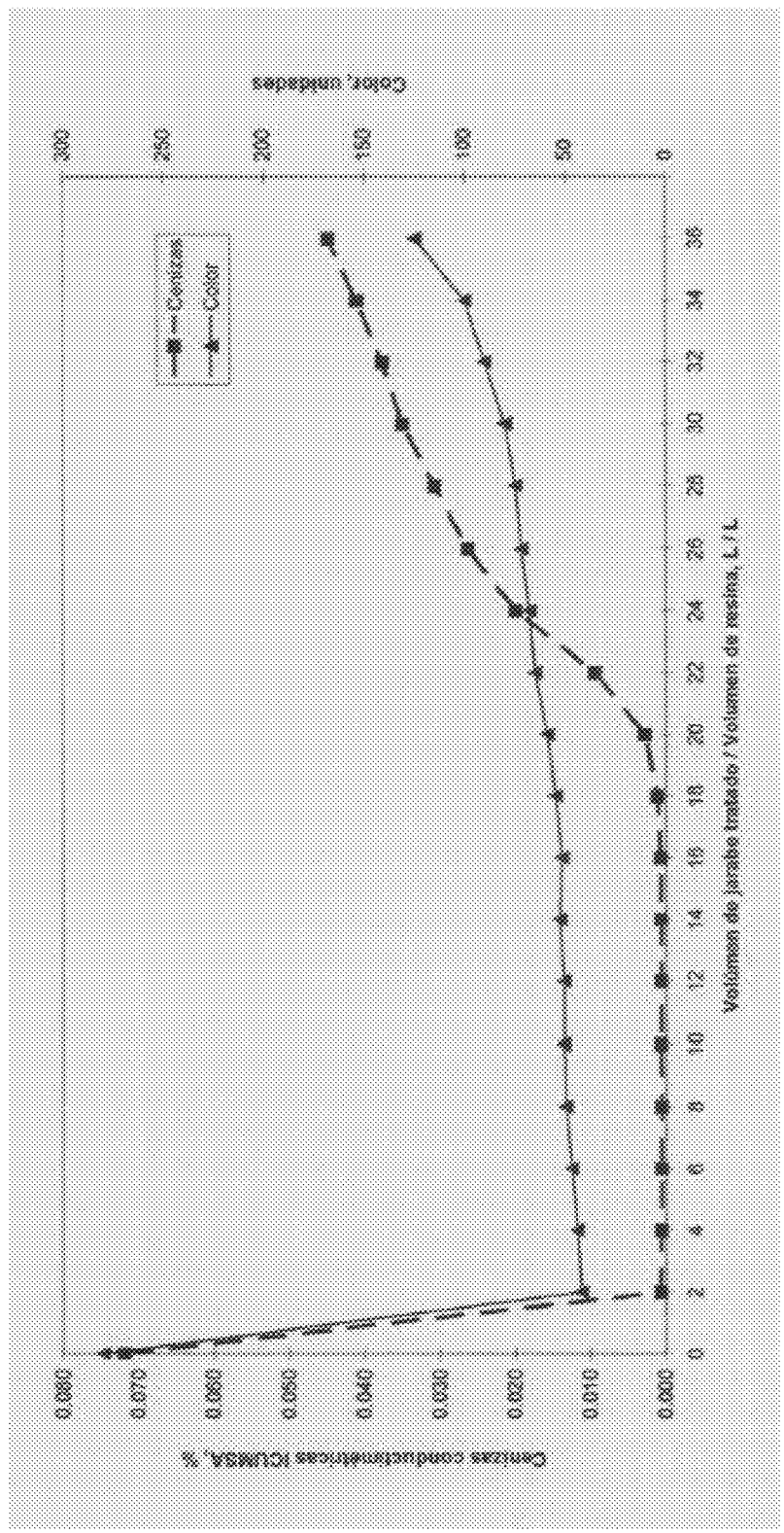

FIGS. 2 and 3 are charts showing the ICUMSA conductimetric ash contents and color or the syrup treated with the ion exchange column on mixed bed used in the examples described below. The charts show the behavior of these two parameters based on the volume of syrup treated vs the volume of ion exchange resin used (BV or Bed Volumes). As it can be seen, the conductimetric ash and color values in the syrup drastically falls during the initial period of the demineralization and complementary bleaching stage, slightly going up in the following volumes of syrup treated, in order to have a sudden increase which indicates the saturation of the resin and the end of the service stage, in order to proceed to the regeneration and start a new service cycle, and so forth.

DETAILED DESCRIPTION OF THE INVENTION

The process proposed in this invention consists of the following stages and for a better understanding thereof, a flowchart is provided in FIG. 1.

1.—Stage: Dissolving. In order to obtain a syrup, the raw granulated sugar is dissolved in hot water at 80° C., using a stirring tank with an indirect type heating system based on steam tubes adding sufficient sugar to the corresponding portion or water so that, once stirred and heated, the mix has a temperature below 70° C., preferably 65° C., a sugar syrup is obtained at a concentration of 55° to 70° Brix, preferably 67° Brix. The sugar syrup prepared in this way is called raw syrup and in order to purify it, it undergoes the subsequent steps of the process.

2.—Stage: Filtering. Once the raw syrup is obtained, the following step is to perform the separation and removal of suspended particles in the syrup, such as mash and other foreign matters coming from the raw material itself which is raw granulated sugar and which, due to the way it is handled during its manufacturing, storage and distribution, it usually contains impurities and foreign material. This removal of suspended particles is performed by filtering, incorporating into the syrup a support material (help filter) such as cellulose powder, diatomea and caoline soils, among others, mixing in a stirring tank and making the mix pass through a pre-filter, press filter such as the frame-and-plate filter, sheet filter and horizontal plates filter. The solids removed are discarded along with the cake formed in the filter and the material filtered is passed to the primary bleaching stage.

3.—Stage: Primary Bleaching. The filtered syrup, at a temperature of 65° C., undergoes a primary bleaching process which is performed by means of an ion exchange column loaded with two beds of strong-base anion-type resins in the form of Chloride, the first bed is an acrylic resin and the second a styrene resin. These two resins are retained in most of the substances that provide the characteristic amber color of the raw sugar syrup, that are usually aromatic or aliphatic compounds with functional ion groups; the styrene resin, besides exchanging anionic coloring substances, in a way similar to acrylic resin, also adsorbs coloring substances that are not of an ionic nature (Cane Sugar Manual, James C. P. Chen, Ed. Limusa, 2004, pp 611-613). The ion exchange column for primary bleaching of the syrup operates with a syrup flow of 0.5-2 BV per hour and with a counter current regeneration based on conventional alkaline brine.

4.—Stage: Demineralizing and Complementary Bleaching. The partially bleached syrup then passes to the demineralization and complementary bleaching process by means of a mix-bed, ion exchange column loaded with two resins mixed, one weak cationic containing carboxylic groups in the form of Hydrogen, and another macro reticular strong anionic resin containing hydroxyl base quaternary amine. The sugar syrup passing through this resin bed exchanges most of the substances that still remain dissolved in the form of cations and anions, for hydrogen and hydroxyl ions that are released by the resins. Given that the anionic and cationic resins are mixed in the same bed, the ionic exchange (cationic and anionic) takes place simultaneously, therefore the hydrogen and hydroxyl ion balance is kept almost constant and the pH of the syrup has no severe disruption, thus avoiding an acid condition which could favor the inversion of the sucrose. In this way, the demineralized product contains a minimum additional amount of inverted sugars. The ion exchange column with mixed resin bed operates in a conventional manner, with descending syrup flow and regeneration in steps with sodium hydroxide and chloridic acid solutions for the anionic and cationic resins, respectively, prior hydrodynamic separation of the resins in the column. While the operation of a column loaded with mixed resin bed is more complex during its regeneration cycle compared with independent beds columns, the adequate design of the equipment and its automated control enables an efficient operation.

5.—Stage: Polishing. Once bleached and demineralized, the syrup that has been treated with the ionic exchange resins is submitted to a polishing process which consists of removing the remaining particles of organic and inorganic suspended solids that render the turbidity of the syrup, such as clayey and sandy materials, among others, and also separate the small amounts of aminic substances coming from the resins which give the product a slight characteristic aminic odor. This process is performed through filtration with the help of an adsorbent means as deodorant. The material used for adsorption is activated carbon in powder, which is incorporated into the syrup along with the help-filter, and is removed with the cake retained in the filter.

6.—Stage: Sanitizing with Ultra Violet rays. Lastly, in order to help in the product's microbiological stability, the syrup is passed through a conventional ultra violet ray system at 240 nanometers wavelength with a dose above 30,000 microwatt-sec/square centimeter, in order to finally deposit it into the containers or reservoirs previously washed and sanitized in which the finished product will be distributed to the users.

Direct advantages obtained with the use of the purification process of the liquid sugar prepared from raw granulated cane sugar presented in this invention are:

1.—This process provides a purified sugar syrup (called purified liquid sugar) from raw granulated sugar, which may have a content of ICUMSA conductimetric ashes greater than 0.25% and a color greater than 600 ICUMSA units, as specified in the Mexican Standard NMX-F-084-SCFI-2004.

2.—The liquid sugar obtained has a purity grade, referred to the content of ashes and color, equal or greater than the purity of the syrup prepared from refined granular cane sugar, which is equivalent to a content of ICUMSA conductimetric ashes lower than 0.04% and a color lower than 45 ICUMSA units. As specified by the Mexican Standard NMX-F-003-SCFI-2003.

3.—Compared to the process for manufacturing sugar syrup from refined granulated sugar, this invention provides a product in the form of syrup without the need of the purification and recrystallization process that takes place in the manufacturing of the refined granulated sugar, which would need to be dissolved one more time in order to obtain the product in the form of syrup or liquid sugar, then being a simple process, with less stages and savings in the consumption of energy. Besides, the product obtained with this process is easier to use by users requiring sugar in the form of syrup, thus avoiding the dissolving and conditioning processes that they have to perform when they start from refined granulated sugar.

4.—The process proposed in this invention enables demineralizing the sugar syrup without promoting the inversion of sucrose in its direct reducing sugars, since the cationic and anionic ion exchange process is performed at the same time in a column of resins packed in the mixed bed, thus avoiding the acid condition that promotes the inversion of sucrose that is normally present when the demineralization takes place in ion exchange columns with independent beds. The product obtained with our process increases in no more than 0.2% the content of direct reducing sugars relative to the contents originally found in raw sugar used as raw material.

EXAMPLES OF THE APPLICATION OF THE INVENTION

Below are two examples that describe the application of the invention:

Example 1

Raw granulated cane sugar with a content of ICUMSA conductimetric ashes of 0.13%, a color of 500 ICUMSA units and a content of inverted sugars of 0.28% in weight, is poured in a dissolution tank provided with stirring and a heating system of steam tubes. For each ton of granulated sugar 0.493 tons of water previously filtered and heated at 80° C. are added. The mixture is heated at 70° C. and stirred until the sugar is completely dissolved. To the syrup obtained, called raw syrup, the support material (help-filter) made up of powder cellulose and diatomea soils, such as high-purity cellulose powder Solka floc 40 from Internacional Fiber Co., and expanded perlite Dicalite 4107 from Dicalite de México, S.A. de C.V. are added. From this tank the mixture is pumped through a pressurized vertical plates filter. The filtered syrup is received at a balance tank which feeds the ionic exchange column loaded with two serial beds of anionic resins, one of the strongly base macro porous acrylic type, such as the Lewatit® VP OC 1074 manufactured by Sybron Chemicals Inc, and the other of the strongly base styrene type, such as the Lewatit® S 6328 A, also from Sybron Chemicals Inc. there, part of the substances that give the characteristic amber color to the standard sugar syrup are retained. The color is reduced in 40 to 60%, obtaining a syrup partially bleached with a color count of 200-300 ICUMSA units. The partially bleached product is then passed through an ion exchange column loaded with a mixed cationic and anionic resin bed, in the adequate proportion, such as poly acrylic actionic resin IMAC HP 336 manufactured by Rohm and Haas and an anionic resin with polystyrene matrix, such as the Amberlite FPA 90 from Rohm and Haas in a 25%-75% ratio, respectively. This mixed bed removes most of the dissolved substances in their dissociated form, reducing the contents of ICUMSA conductimetric ashes in the syrup in up to 99% and the ICUMSA color in up to 85% as shown in FIG. 2. The product obtained from this mixed-bed, ion-exchange column contains around 0.001% of ICUMSA conductimetric ashes and 40 ICUMSA units of color, with an increase in the content of inverted sugar of less than 0.2% with respect to the contents of inverted sugars coming from raw granulated sugar used as raw material.

Once the ion exchange resins from the mixed beds get saturated, the contents of ashes and the color of the product obtained from the column starts to increase, as shown in the chart in FIG. 2. At that time the service cycle of the column is stopped and the resins are regenerated for a new service cycle and so forth.

The product that is obtained from the mixed-bed, ion-exchange column is deposited in a stirring tank in order to proceed to the polishing, incorporating the adequate amount of filtering materials and adsorbing material, such as high-purity cellulose powder Solka Floc 40 from Internacional Fiber Co., with diatomea soil or expanded perlite Dicalite 4107 from Decalite de Mexico, S.A. de C.V. and activated carbon in powder Ecosorb S-426 from Graver Technologies Inc., and then the mixture is passed through a pressurized vertical plates filter in order to remove the adsorbent material along with the solid particles remaining in the syrup and the characteristic aminic odor. The sugar syrup produced in this way contains in average 0.01% of ICUMSA conductimetric ashes, a color below 45 ICUMSA units, a pH between 6.0 and 7.5 and a content of inverted sugars of 0.3% on dry based weight. The contents of conductimetric ashes and ICUMSA color of the processed syrup exceeds in purity the specification of refined granulated sugar, therefore, the product obtained with this process has lower content of conductimetric ashes and ICUMSA color than refined sugar.

Example 2

Raw granulated cane sugar with a content of ICUMSA conductimetric ashes of 0.07%, a color of 650 ICUMSA units and a content of inverted sugars of 0.4% in weight is poured in a dissolving tank provided with stirring and a heating system based on steam tubes. For each ton of granular sugar, 0.493 tons of water previously filtered and heated at 80° C. are added. The mix is heated at 70° C. and stirred until the sugar is fully dissolved in the water. To the syrup obtained, called raw syrup, the support material (help filter) based on powder cellulose and diatomea soils such as, for example, the high-purity cellulose powder Solka folc 40 from Internacional Fiber Co, and the expanded perlite Dicalite 4107 from Dicalite de México, S.A. de C.V. From this tank the mixtures is pumped through a pressurized vertical plates filter. The filtered syrup is received at a balance tank which feeds the ion-exchange column loaded with two serial beds of anionic resins, one of the strongly base macro porous acrylic type, such as the Lewatit® VP OC 1074 manufactured by Sybron Chemicals Inc, and the other of the strongly base styrene type, such as the Lewatit® S 6328 A, also from Sybron Chemicals Inc. There, part of the substances that give the characteristic amber color to the standard sugar syrup are retained. The color is reduced in 40 to 60%, obtaining a syrup partially bleached with a color count between 260 and 390 ICUMSA units. The partially bleached product is then passed through an ion exchange column loaded with a mixed cationic and anionic resin bed, in the adequate proportion, such as poly acrylic cationic resin IMAC HP 336 manufactured by Rohm and Haas and an anionic resin with polystyrene matrix, such as the Amberlite FPA 90 from Rohm and Haas in a 25%-75% ratio, respectively. This mixed bed removes most of the dissolved substances in their dissociated form, reducing the contents of ICUMSA conductimetric ashes in the syrup in up to 99% and the ICUMSA color in up to 85% as shown in FIG. 3. The product obtained from this mixed-bed, ion-exchange column contains around 0.001% of ICUMSA conductimetric ashes and 44 ICUMSA units of color, with an increase in the content of inverted sugar of less than 0.2% with respect to the contents of inverted sugars coming from raw granulated sugar used as raw material.

Once the ion exchange resins from the mixed beds get saturated, the contents of ashes and the color of the product obtained from the column starts to increase, as shown in the chart in FIG. 3. At that time the service cycle of the column is stopped and the resins are regenerated for a new service cycle and so forth.

The product that is obtained from the ion exchange column in mixed bed is deposited in a stirring tank in order to proceed to the polishing, incorporating the adequate amount of filtering materials and adsorbing material, such as high-purity cellulose powder Solka Floc 40 from Internacional Fiber Co., with diatomea soil or expanded perlite Dicalite 4107 from Decalite de México, S.A. de C.V. and activated carbon in powder Ecosorb S-426 from Graver Technologies Inc., and then the mixture is passed through a pressurized vertical plates filter in order to remove the adsorbent material along with the solid particles remaining in the syrup and the characteristic aminic odor. The sugar syrup produced in this way contains in average 0.01% of ICUMSA conductimetric ashes, a color below 45 ICUMSA units, a pH between 6.0 and 7.5 and a content of inverted sugars of 0.5% on dry based weight. The contents of conductimetric ashes and ICUMSA color of the processed syrup exceeds in purity the specification of refined granulated sugar, therefore, the product obtained with this process has lower content of conductimetric ashes and ICUMSA color than refined sugar.

It is hereby stated that as of this date, the best method known by the applicant in order to apply the aforementioned invention, is the one resulting from this description of the invention.

After having sufficiently described our invention, we consider of our exclusive property the contents of the following clauses:

1. A process for purifying liquid sugar prepared from raw granulated sugar, comprising the following steps:

(a) dissolving raw granular sugar in water in order to obtain a raw syrup;
    (b) filtering the raw syrup;
    (c) primary bleaching the filtered raw syrup by ion exchange with anionic resins;
    (d) demineralizing and complementary bleaching the filtered raw syrup by ion exchange with cationic- and anionic resins packed in a mixed bed column;
    (e) polishing the bleached raw syrup by contact with an adsorbing powder material and filtering; and
    (f) sanitizing the polished syrup with ultra violet rays, resulting in a product syrup.

2. The process of claim 1, wherein the product syrup has a sugar content of 65 to 70° Brix.

3. The process of claim 1, wherein the product syrup has an ICUMSA conductimetric ash content lower than 0.04%.

4. The process of claim 1, wherein the product syrup has a color below 45 ICUMSA units.

5. The process of claim 1, wherein the product syrup has a pH value of 6.0 to 7.5.

6. The process of claim 1, wherein the product syrup has a sugar content of 65 to 70° Brix, with an ICUMSA conductimetric ash content lower than 0.04%, a color below 45 ICUMSA units and a pH value of 6.0 to 7.5.

7. The process of claim 1, wherein the primary bleaching step takes place by means of ion-exchange resins of the strong base anionic type, in the form of chloride, passing through the resin the raw syrup with a concentration of 65 to 75° Brix, at a temperature of 65 to 70° C. and a flow of 1-2 volumes of syrup per volume of resin per hour.

8. The process of claim 1 or claim 7, wherein the color of the product syrup is reduced between 40% and 60% ICUMSA units.

9. The process of claim 1, wherein the demineralizing and complimentary bleaching step is performed by means of mixed ion exchange resins operating a mixed bed column, one of them of the weak cationic type with a carboxylic functional group in the form of hydrogen mixed with an exchange resin of the strong anionic type with functional group of quaternary amine and in the form of hydroxyl, and passing the raw syrup that has a concentration of 65 to 70° Brix, at a temperature of 65 to 70° C. and a flow of 1-2 volumes of syrup per the volume of resin per hour.

10. The process of claim 1 or claim 9, wherein the contents of ICUMSA conductimetric ashes in the product syrup is reduced between 90% and 99%.

11. The process of claim 1 or claim 9, wherein the color of the product syrup is reduced between 60% to 90% ICUMSA units.

12. The process of claim 1 or claim 9, wherein the color and ash content of the product syrup is reduced simultaneously.

13. The process of claim 1 or claim 9, wherein the content of direct-reducing sugars in the product syrup does not increase beyond 0.2%.

14. The process of claim 1 or claim 6, characterized by a wherein the raw granulated cane sugar has an ICUMSA conductimetric ash content greater than 0.25% and a color greater than 600 ICUMSA units.

15. The process of claim 1, wherein the product syrup has an ICUMSA conductimetric ash content between about 0.001% to about 0.04% and color between about 25 and 45 ICUMSA units.

16. The process of claim 1, wherein the product syrup contains direct-reducing sugars no greater than 0.2% of the content of direct-reducing sugars in the raw granulated sugar.

* * * * *